United States Patent
Hwang

(10) Patent No.: US 7,075,410 B2
(45) Date of Patent: Jul. 11, 2006

(54) MOBILE REMOTE-CONTROLLED BURGLAR-PROOF LEARNING SYSTEM

(76) Inventor: Shih-Ming Hwang, 16842 Millikan Ave., Irvine, CA (US) 92606

( * ) Notice: Subject to any disclaimer, the term of this patent is extended or adjusted under 35 U.S.C. 154(b) by 387 days.

(21) Appl. No.: 10/608,036

(22) Filed: Jun. 30, 2003

(65) Prior Publication Data

US 2004/0263317 A1    Dec. 30, 2004

(51) Int. Cl.
*H04Q 1/00* (2006.01)
*G05B 23/00* (2006.01)

(52) U.S. Cl. ............... 340/5.24; 340/5.72; 340/825.69; 340/426.36

(58) Field of Classification Search ............... 340/5.24, 340/5.23, 5.72, 5.61, 5.64, 825.69, 825.72, 340/426.17, 426.36
See application file for complete search history.

(56) References Cited

U.S. PATENT DOCUMENTS

| | | | | |
|---|---|---|---|---|
| 4,754,255 A | * | 6/1988 | Sanders et al. | 307/10.4 |
| 5,479,156 A | * | 12/1995 | Jones | 340/5.64 |
| 5,602,535 A | * | 2/1997 | Boyles et al. | 340/5.22 |
| 5,648,764 A | * | 7/1997 | Nose et al. | 340/5.3 |
| 5,677,680 A | * | 10/1997 | Yoda | 340/825.57 |
| 5,781,143 A | * | 7/1998 | Rossin | 341/173 |
| 5,864,297 A | * | 1/1999 | Sollestre et al. | 340/5.23 |

* cited by examiner

*Primary Examiner*—Edwin C. Holloway, III
(74) *Attorney, Agent, or Firm*—Rosenberg, Klein & Lee

(57) ABSTRACT

An intelligent learning determining system is disclosed. The intelligent learning determining system includes a receiving part and an emitting part. The receiving part at least includes a micro-controller, a memory, a register, a control circuit and a receiving circuit. The emitting part at least includes a code circuit and an emitting interface circuit. Using the above device under learning mode, a control host can be corresponding to plural remote control devices by an intelligent type of repeatable code setting, and when a new code is set, all old codes are cleared after the new code is confirmed. The system can prevent the lost of the remote control device or prevent an evildoer from setting another code, so as to decrease the rate of car-lost. When the user finds that the original usable code becomes unusable, it may because the evildoer clears the original usable code and sets another code so that the original code becomes unusable. In the meantime, the user can reset a correct user code to clear other external code to prevent the car from being stolen.

9 Claims, 4 Drawing Sheets

MOBILE REMOTE-CONTROLLED BURGLAR-PROOF LEARNING SYSTEM

BACKGROUND OF THE INVENTION

1. Field of the Invention

The present invention relates to an intelligent learning determining system, and more particularly to a remote control device having code learning function and code wash function, in which when setting a new code, the old code is cleared after the new code is confirmed.

2. Description of the Prior Art

The program design of the code setting circuit in a common burglarproof device is First in First out. When setting codes, the codes can be stored in the memory according to the sequence of the learning code, so that one car can be controlled by plural remote control devices at the same time.

However, the operating method described above has many disadvantages. For example, when the car owner hands over his car to other people (such as a parking guy or a car maintenance worker), it is easy to add a code if an evildoer tries to obtain the car. The method to add a code is to let the burglarproof device into learning state and set the code in the host. The host can store the codes in the memory in sequence according to the First in First out manner. Therefore, the host can receive new and illegal codes while the car owner may not observe.

Therefore, the device of the prior art has many defects. So it is not a good design and should be improved.

Because of the above described disadvantages generated from the burglarproof device of the prior art, the applicant keeps on carving unflaggingly to develop the intelligent learning determining system of the present invention through wholehearted experience and research.

SUMMARY OF THE INVENTION

It is an object of the present invention to provide an intelligent learning determining system to prevent the lost of the emitting part device or prevent an evildoer from setting another code in the host, so as to decrease the rate of car-lost. When the above condition is happened, the user can reset a code of the remote control device of the car, and the lost code or the code set by the evildoer can be clearly completely.

It is another object of the present invention to provide an intelligent learning determining system to be used by the car consignee. The car is installed a burglarproof device when it is not sold. But for the convenience to manage, display and provide for the customer to test the car, the burglarproof devices of all cars are set and learned a master code used only by the consignee. Therefore, the sales of the consignee can relieve the burglarproof system of the cars by a specific emitter so as to rapidly display cars and provide cars for the customer to test according to the customer's requests. Once the customer chooses the car he wants to buy, the car can re-learn a user code and delete the master code used by the consignee automatically. Using such device, rapid service can be achieved and the burglarproof system is safe and reliable.

It is an additional object of the present invention to provide an intelligent learning determining system in which a new code is stored in a register and the memory host will not replace the old code by the new code immediately so as to avoid that the new code is unfit or the learning process is not complete or is interfered. The old codes are deleted after the new code is confirmed by the host to sure it is usable. In addition, it is allowable to re-learn a new code.

It is a further object of the present invention to provide an intelligent learning determining system in which a warning device is set in the receiving part for providing the operating process to the user so as to avoid that the new code is unfit or the learning process is not complete or is interfered. The warning device can be a buzzer or a light emitting diode (LED).

The intelligent learning determining system having above-described advantages includes a receiving part and an emitting part. The receiving part at least includes a micro-controller, a memory, a register, a control circuit and a receiving circuit. The emitting part at least includes a code circuit and an emitting interface circuit. Using the above device under learning mode, a control host can be corresponding to plural remote control devices by an intelligent type of repeatable code setting, and when a new code is set, only after the new code is confirmed, all old codes are cleared to achieve code wash function.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

The present invention will become more clearly by the following detailed description.

The operating method of the remote control device of the present invention is described as following steps:

a) providing a recognition code in a central control unit of a memory host in a car having burglarproof function to filter an emitting device of a different group, wherein a memory circuit is ready for storing a reading code in a memory device;

b) checking if a receiving recognition code is right when code learning function of said host is turned on by an emitting device of the same group in an effective range of said host under code leaning mode, and then transmitting a new code to a register of said host, and c) determining said new code is a master code or a user code and if it is inputted in the first time, and then clearing a memory and storing said new code in said memory to replace an old code and achieve code wash function.

Figure 1:
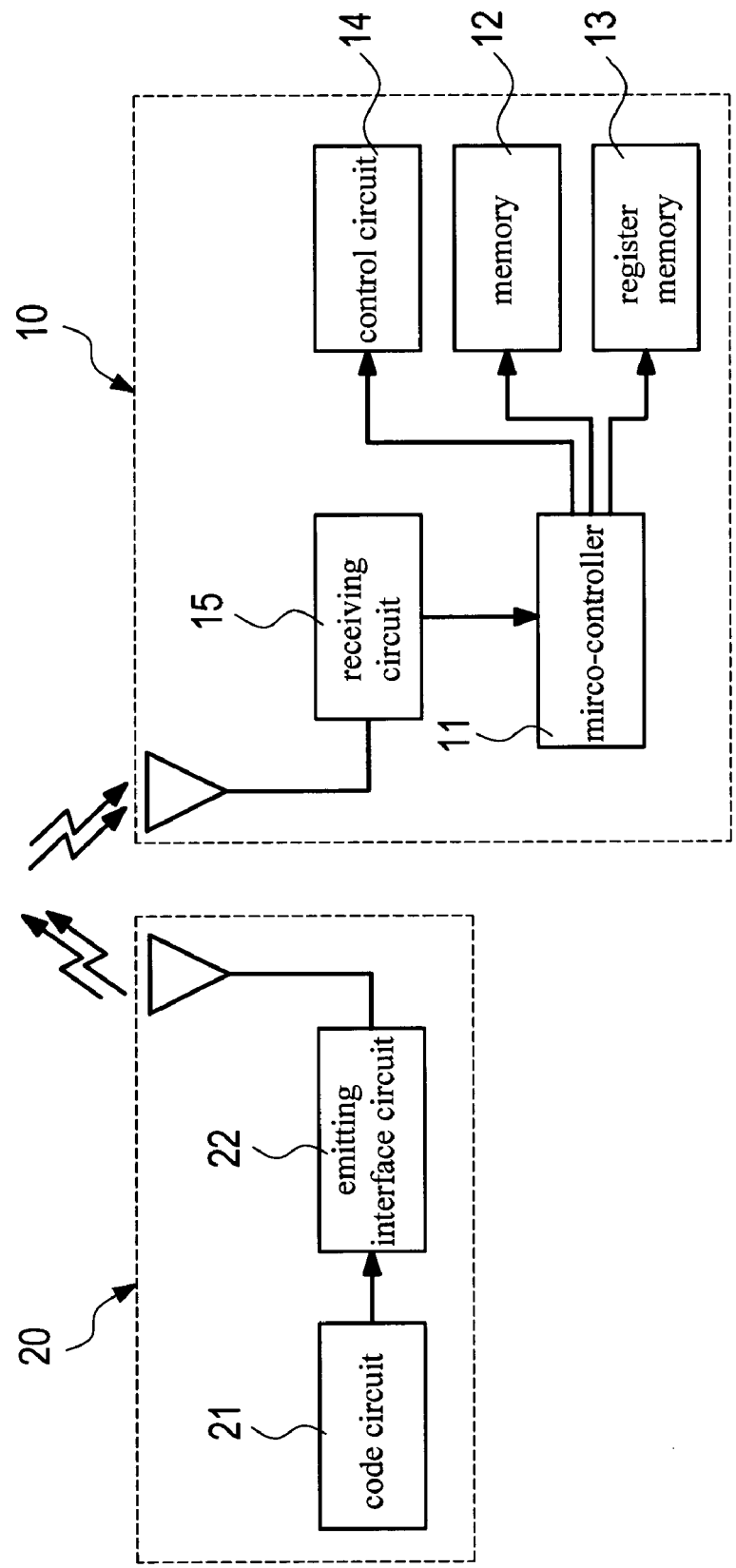
FIG. 1 is a block diagram of the intelligent learning determining system according to a preferred embodiment of the present invention.

Please refer to FIG. 1. The intelligent learning determining system of the present invention includes a receiving part 10 and an emitting part 20. The receiving part 10 at least includes a micro-controller 11, a memory 12, a register 13, a control circuit 14 and a receiving circuit 15. The emitting part 20 at least includes a code circuit 21 and an emitting interface circuit 22. Using the above device under learning mode, a control host can be corresponding to plural remote control devices by an intelligent type of repeatable code setting, and when a new code is set, all old codes are cleared after the new code is confirmed. Then the user can set the codes of other remote control devices sequentially.

When the code circuit 21 of the emitting part 20 sends a code via any output type, the receiving part 10 receives the code by the receiving circuit 15. The received code has two kinds: one is a recognition code and the other is a user code or a master code. The recognition code must be checked at first, and next steps can go on when the recognition code is right. The code is processed by the micro-controller 11 and the control circuit 14, which test and control an external circuit, and is reminded by twinkling of a car lamp or a warning system, then the new code is stored and all old codes are cleared to achieve code wash function and effectively prevent an evildoer from committing a crime by high-tech products. Therefore, it is necessary to prevent the system from being invaded by the aforesaid code wash function when the car is handed over to other people (such as a parking guy or a car maintenance worker).

Figure 2:
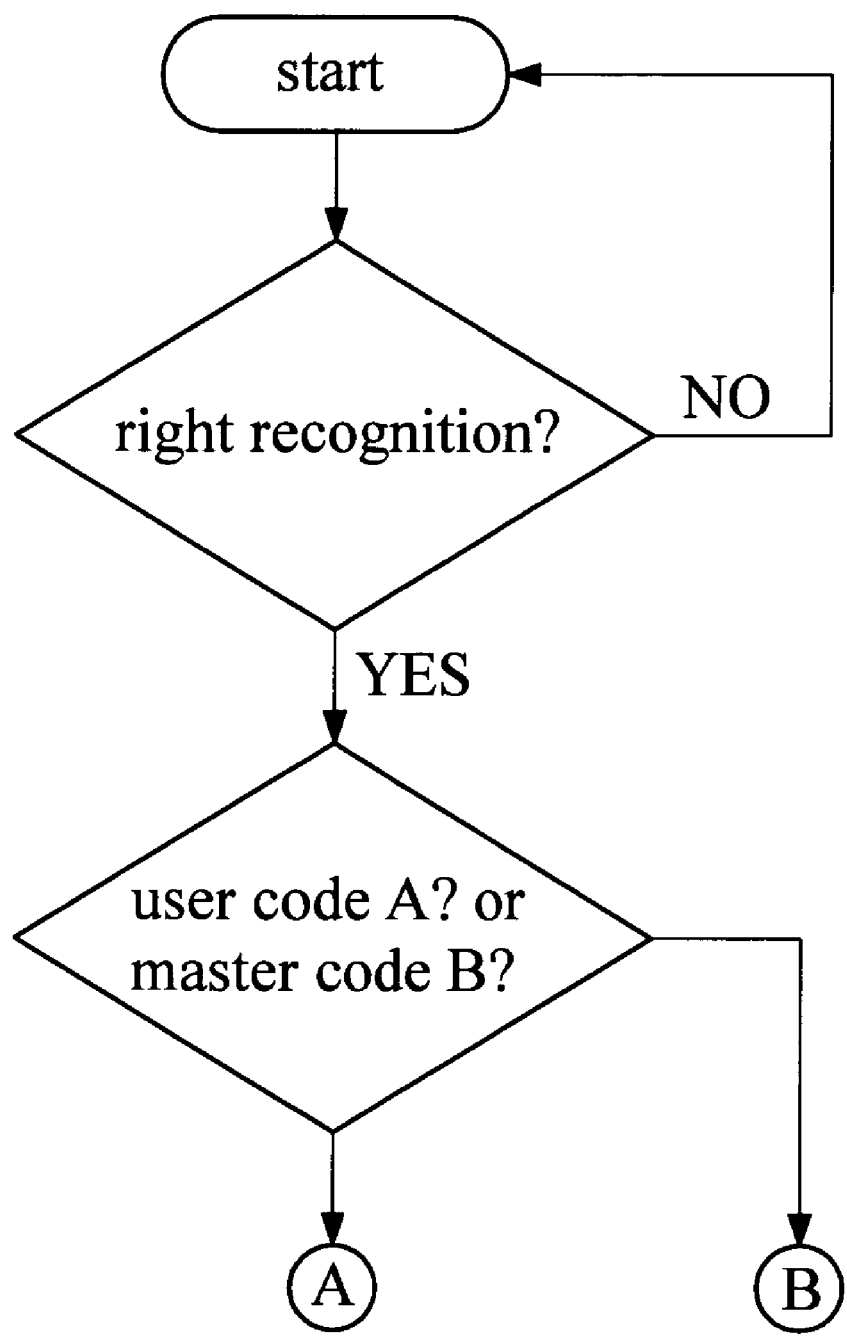
FIG. 2 is a flowchart of the setting actions of the intelligent learning determining system.

Please refer to FIG. 2 showing a general setting and operating flowchart. The user must operate the remote control device in the effective distance of the car. When the user pushes the button, the receiving part starts to check if the recognition code is right and filter the emitting device of the same group. If the recognition code is wrong, the control host of the receiving part will not work. If the recognition code is right, the micro-controller will determine the code is a master code or a user code. The above two codes cannot exist in the control host at the same time, which can be achieved by simple program design.

Figure 3:
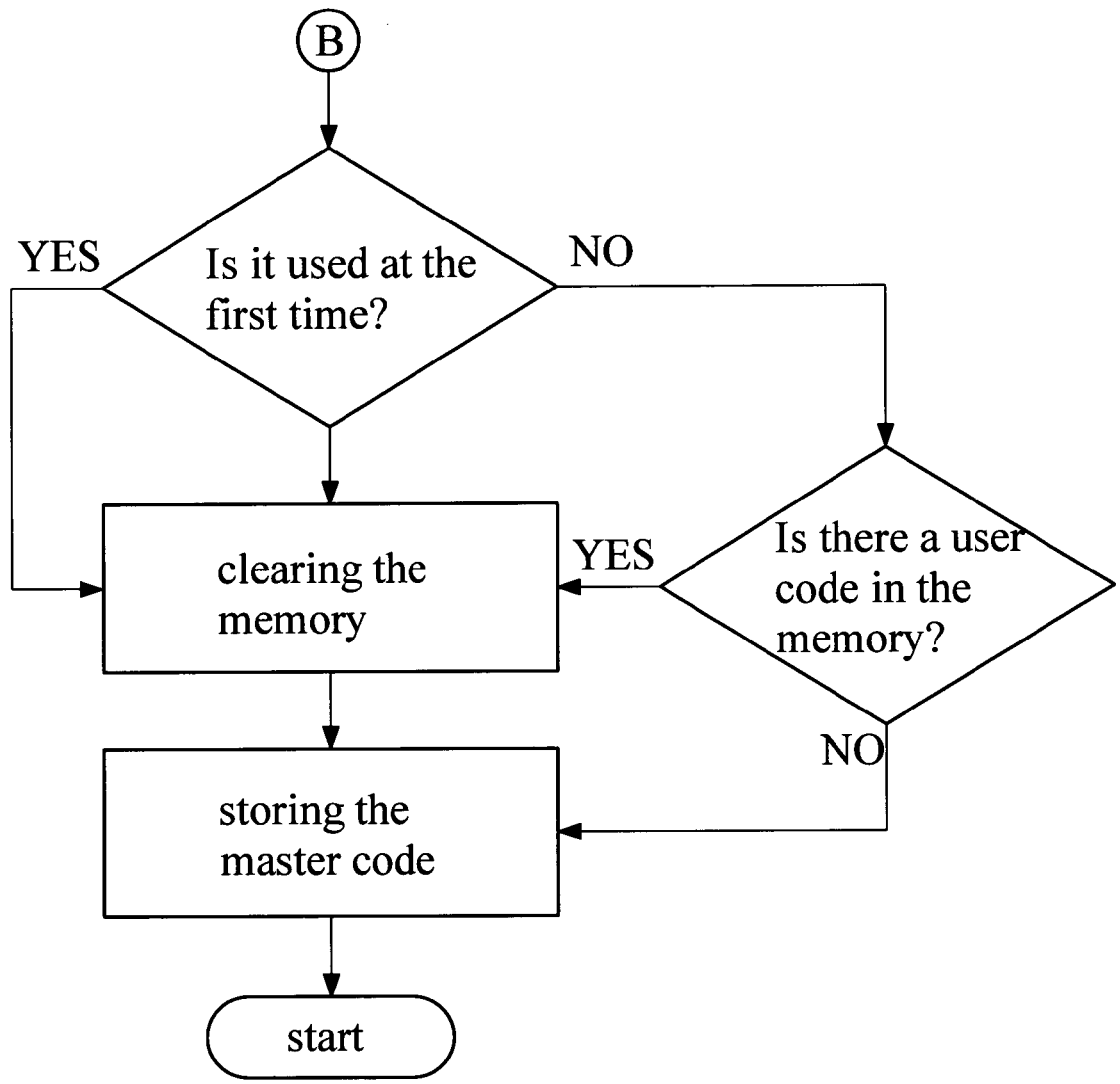
FIG. 3 is a setting flowchart of a master code used by the consignee of intelligent learning determining system.

Please refer to FIG. 3. When a master code is determined after the flowchart of FIG. 2, the micro-controller will determine if it is used at the first time. If it is used at the first time, the memory is cleared first, and then the master code is stored in the memory. If it is not used at the first time, the micro-controller will determine if there is a previous user code in the memory. If there is a previous user code in the memory, all old codes are cleared and the new master code is stored in the memory. If not, the new master code is directly stored in the memory.

Figure 4:
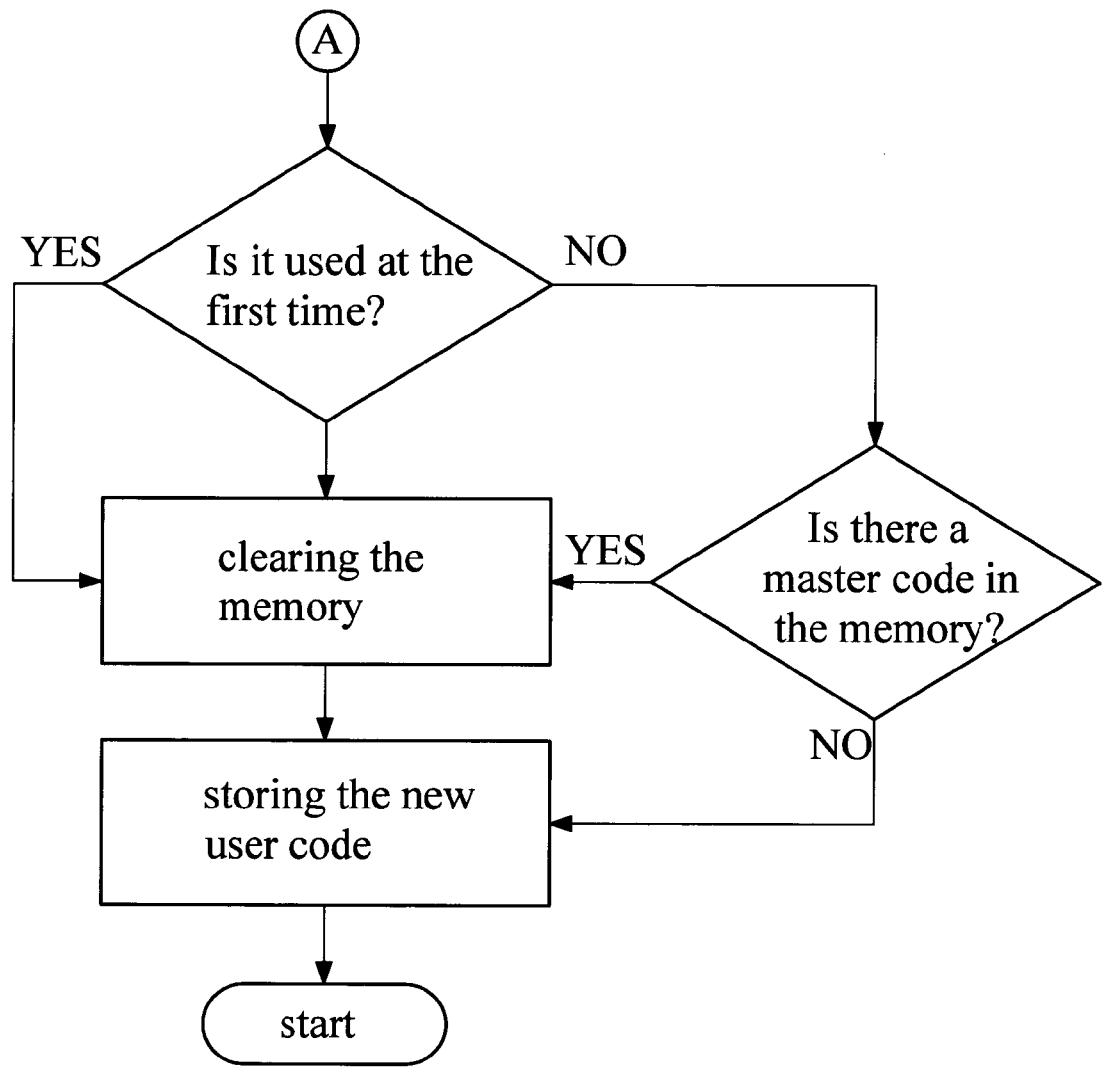
FIG. 4 is a setting flowchart of a user code of intelligent learning determining system

Please refer to FIG. 4. When a user code is determined after the flowchart of FIG. 2, the micro-controller will determine if it is used at the first time. If it is used at the first time, the memory is cleared first, and then the user code is stored in the memory. If it is not used at the first time, the micro-controller will determine if there is a previous master code in the memory. If there is a previous master code name in the memory, all old codes are cleared and the new user code is stored in the memory. If not, the new user code is directly stored in the memory. Afterward, the user can set the codes of other remote control devices sequentially to backup or for the use of his family.

The intelligent learning determining system provided by the present invention has following advantages when compared with other prior art:

1. It can prevent the lost of the emitting part device or prevent an evildoer from setting another code, so as to decrease the rate of car-lost. When the user finds that the original usable code becomes unusable, it may because the evildoer clears the original usable code and sets another code so that the original code becomes unusable. In the meantime, the user can reset a correct user code to clear other code.

2. For preventing the negligence of the user, the present invention provides a negligence-preventing device which adds code learning function and code wash function. Bt re-learning the code of the remote control device of the car, the lost code or the code set by the evildoer can be clearly completely.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An operating method of a remote control device, comprising steps of:
   a) providing a recognition code in a central control unit of a memory host in a car having burglarproof function to distinguish an emitting device of a particular group from an emitting device of a different group, wherein a memory circuit is ready for storing a reading code in a memory device;
   b) checking if a receiving recognition code corresponds to said recognition code of said central control unit and actuating responsive thereto a code learning function of said host, an emitting device of the particular group in an effective range of said host thereby placing said host under code learning mode, and thereafter transmitting a new code to a register of said host;
   c) determining whether said new code is of a master code or a user code form;
   d) additionally determining whether prior entry has been made in said memory device of any code having the same code form as said new code, and selectively clearing said memory device responsive thereto; and,
   e) storing said new code in said memory device to replace an old code and achieve code wash function.

2. The operating method according to claim 1, wherein said master code and said user code do not exist in said memory at the same time.

3. The operating method according to claim 1, wherein when said user code is not used at the first time, determining if a previous master code exists in said memory, and clearing all old codes and storing a new user code in said memory when said previous master code exists in said memory, or directly storing said new user code in said memory when said previous master code does not exist in said memory.

4. The operating method according to claim 1, wherein when said master code is not used at the first time, determining if a previous user code exists in said memory, and clearing all old codes and storing a new master code in said memory when said previous user code exists in said memory, or directly storing said new master code in said memory when said previous user code does not exist in said memory.

5. An intelligent learning determining system, comprising:
   a receiving part at least having a micro-controller, a memory, a register, a control circuit and a receiving circuit; and
   an emitting part at least having a code circuit and an emitting interface circuit,
   said receiving part receiving first and second codes from said emitting part, said receiving part being operable to compare said first code to a recognition code to distinguish an emitting device of a particular group from an emitting device of a different group;
   said receiving part being operable to determine whether said second code is of a master code or user code form;

said receiving part being operable to additionally determine whether prior entry has been made in said memory of any code having the same code form as said second code, and selectively clearing said memory responsive thereto before storing said second code in said memory;

thereby a control host is provided corresponding to plural remote control devices by selectively controlled repeatable code setting, and when a new code is set, all old codes are cleared after said new code is confirmed.

6. The system according to claim 5, wherein said first code is a recognition code and said second code is one of a user code or a master code, wherein said recognition code is checked at first for going on next steps, and said first and second codes are processed by said micro-controller and said control circuit, which test and control an external circuit, and responsively control a twinkling of a car lamp or a warning system, and said second code is stored and all old codes are cleared.

7. The system according to claim 5, wherein said master code and said user code do not exist in the same system at the same time, so that only one of said master code and said user code exists in the control host.

8. The system according to claim 5, wherein a warning device of a light emitting diode (LED) is set in said receiving part for providing an operating process to the user.

9. The system according to claim 5, wherein a warning device of a buzzer is set in said receiving part for providing an operating process to the user.

* * * * *